(12) United States Patent
Xiao et al.

(10) Patent No.: US 11,979,027 B2
(45) Date of Patent: May 7, 2024

(54) CONTROL METHOD AND ELECTRONIC DEVICE

(71) Applicant: Lenovo (Beijing) Limited, Beijing (CN)

(72) Inventors: Qihua Xiao, Beijing (CN); Zhijian Mo, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 35 days.

(21) Appl. No.: 17/958,309

(22) Filed: Sep. 30, 2022

(65) Prior Publication Data
US 2023/0179021 A1 Jun. 8, 2023

(30) Foreign Application Priority Data
Dec. 6, 2021 (CN) .......................... 202111480302.X

(51) Int. Cl.
*H02J 50/05* (2016.01)
*H02J 7/34* (2006.01)
*H02J 50/00* (2016.01)
*H02J 50/90* (2016.01)

(52) U.S. Cl.
CPC .............. *H02J 50/05* (2016.02); *H02J 7/345* (2013.01); *H02J 50/005* (2020.01); *H02J 50/90* (2016.02); *H02J 2207/20* (2020.01)

(58) Field of Classification Search
None
See application file for complete search history.

(56) References Cited

U.S. PATENT DOCUMENTS

| | | |
|---|---|---|
| 2016/0315504 A1* | 10/2016 | Ichikawa ................ H02J 50/05 |
| 2017/0136902 A1* | 5/2017 | Ricci ...................... B60L 53/38 |
| 2022/0140637 A1* | 5/2022 | Hosoi ..................... H02J 50/05 |
| | | 307/104 |

\* cited by examiner

*Primary Examiner* — Jared Fureman
*Assistant Examiner* — Joel Barnett
(74) *Attorney, Agent, or Firm* — ANOVA LAW GROUP, PLLC

(57) ABSTRACT

A control method. The control method includes determining whether a second electronic device is placed on a touch panel of a first electronic device, the touch panel including a first electrode layer, the second electronic device including a second electrode layer, the second electrode layer being configured to form a charging capacitor unit with the first electrode layer; controlling the first electrode layer and the second electrode layer opposite to the first electrode layer to form the charging capacitor unit when it is determined that the second electronic device is placed on the touch panel; and controlling a first power module of the first electronic device to provide power to the first electrode layer to supply power to the second electronic device through the charging capacitor unit; or, controlling the first power module to receive power transmitted by the second electronic device through the charging capacitor unit.

20 Claims, 3 Drawing Sheets

CONTROL METHOD AND ELECTRONIC DEVICE

CROSS-REFERENCES TO RELATED APPLICATION

This application claims priority to Chinese Patent Application No. 202111480302.X filed on Dec. 6, 2021, the entire content of which is incorporated herein by reference.

FIELD OF TECHNOLOGY

The present disclosure relates to the technical field of wireless charging and, more specifically, to a control method and an electronic device.

BACKGROUND

With the development and application of wireless charging technology, there are more electronic devices using wireless charging technology, making electronic devices more convenient to use. Conventional wireless charging technology generally requires a built-in wireless charging coil in the electronic device to realize wireless charging based on the principle of electromagnetic induction. However, this type of wireless charging method not only has high hardware cost, but also occupies the internal space of the electronic device, which is not beneficial to the thickness reduction of the electronic device.

BRIEF SUMMARY OF THE DISCLOSURE

One aspect of the present disclosure provides a control method. The control method includes determining whether a second electronic device is placed on a touch panel of a first electronic device, the touch panel including a first electrode layer, the first electrode layer being configured to detect a touch position of a touch object on the touch panel, the second electronic device including a second electrode layer, the second electrode layer being configured to form a charging capacitor unit with the first electrode layer; controlling the first electrode layer and the second electrode layer opposite to the first electrode layer to form the charging capacitor unit when it is determined that the second electronic device is placed on the touch panel; and controlling a first power module of the first electronic device to provide power to the first electrode layer to supply power to the second electronic device through the charging capacitor unit; or, controlling the first power module to receive power transmitted by the second electronic device through the charging capacitor unit.

Another aspect of the present disclosure provides an electronic device. The electronic device includes a touch panel, the touch panel including a first electrode layer, the first electrode layer being configured to detect a touch position of a touch object on the touch panel; a controller configured to determine whether a second electronic device is placed on the touch panel, the second electronic device including a second electrode layer, the second electrode layer being configured to form a charging capacitor unit with the first electrode layer, the first electrode layer being controlled to form the charging capacitor unit with the opposite second electrode layer when it is determined that the second electronic device is placed on the touch panel; and a first power module configured to provide power to the first electrode layer under the control of the controller to supply power to the second electronic device through the charging capacitor unit; or to receive power transmitted by the second electronic device through the charging capacitor unit under the control of the controller.

Another aspect of the present disclosure provides a non-transitory computer-readable storage medium containing computer-executable instructions for, when executed by one or more processors, performing a control method applied to a first electronic device. The method includes determining whether a second electronic device is placed on a touch panel of a first electronic device, the touch panel including a first electrode layer, the first electrode layer being configured to detect a touch position of a touch object on the touch panel, the second electronic device including a second electrode layer, the second electrode layer being configured to form a charging capacitor unit with the first electrode layer; controlling the first electrode layer and the second electrode layer opposite to the first electrode layer to form the charging capacitor unit when it is determined that the second electronic device is placed on the touch panel; and controlling a first power module of the first electronic device to provide power to the first electrode layer to supply power to the second electronic device through the charging capacitor unit; or, controlling the first power module to receive power transmitted by the second electronic device through the charging capacitor unit.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Figure 1:
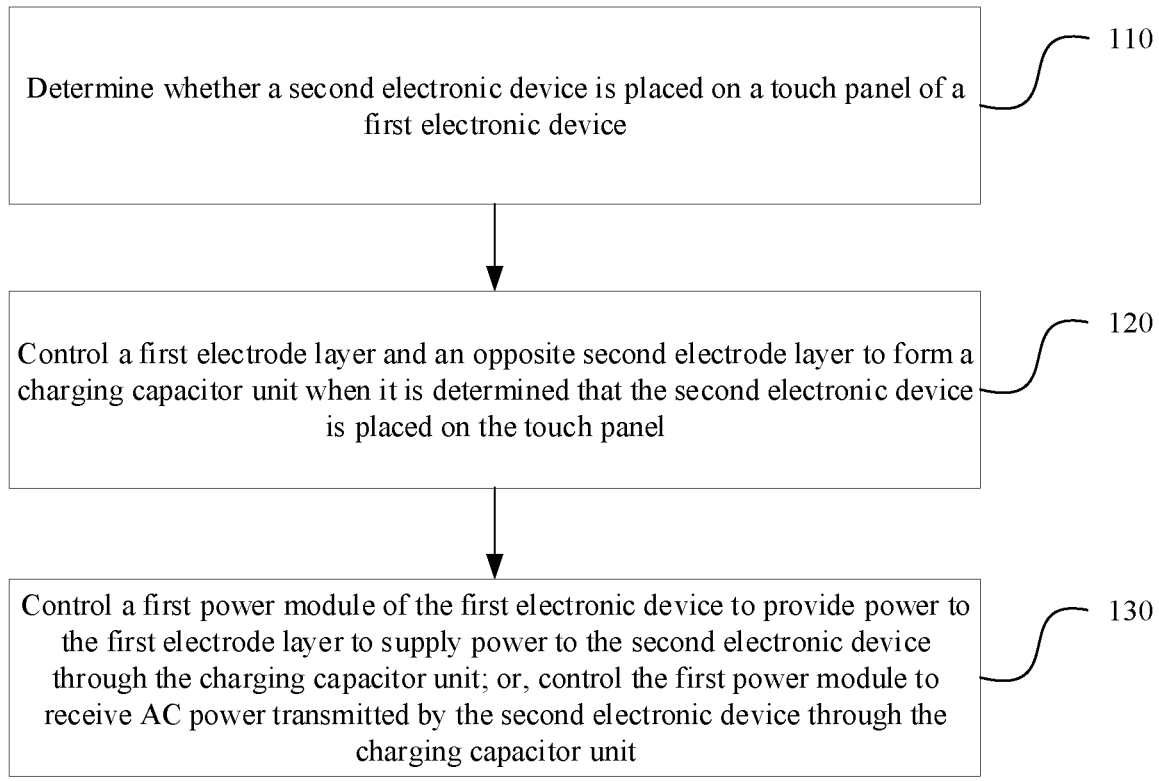
FIG. 1 is a flowchart of a control method according to an embodiment of the present disclosure.

Hereinafter, aspects, features, and embodiments of the present disclosure will be described with reference to the accompanying drawings. It should be understood that such description is illustrative only but is not intended to limit the scope of the present disclosure. In addition, it will be understood by those skilled in the art that various modifications in form and details may be made therein without departing from the spirit and scope of the present disclosure.

It should be understood that although the present application has been described with reference the specific embodiments, many other equivalents of the present disclosure may be implemented by those skilled in the art with features of the claims of the present disclosure, and are therefore within the scope of protection defined herein.

Embodiments of the present disclosure are described hereinafter with reference to the accompanying drawings. However, it should be understood that these embodiments are merely examples of the present disclosure, which may be implemented in various ways. Well-known and/or repetitive functions or structures are not described in detail in order to clarify the true intent based on a user's operation history, and avoid unnecessary details that may obscure the present disclosure. Therefore, the specific structural and functional details of the present disclosure are not intended to be limiting, but are merely used as the representative basis of the claims to teach those skilled in the art to use the present disclosure in virtually any suitable and detailed structure.

In the specification, terms such as "in one embodiment", "in another embodiment", "in an additional embodiment", or "in other embodiments" may all refer to one or more the same or different embodiments of the present disclosure.

Refer to FIG. 1 to FIG. 4, an embodiment of the present disclosure provides a control method. The method will be described in detail below.

110, determining whether a second electronic device 20 is placed on a touch panel 12 of a first electronic device 10, the touch panel 12 including a first electrode layer 17 for detecting a touch position of a touch object on the touch panel 12, the second electronic device 20 including a second electrode layer 21 configured to form a charging capacitor unit with the first electrode layer 17.

The first electronic device 10 may be the execution body of the control method of the embodiments of the present disclosure, and the first electronic device 10 may include a capacitive touch panel 12. In some embodiments, the first electronic device 10 may be a notebook computer, a tablet, a smart phone, a smart car, or other electronic devices having a touch panel 12.

The touch panel 12 may be a separately provided capacitive touch device for performing touch operations. For example, the touch panel 12 may be a touch panel on a C-side of a notebook computer. The touch panel 12 may also be a capacitive touch assembly disposed on the display screen, and the capacitive touch assembly may form a capacitive touch screen together with the display screen.

Figure 3:
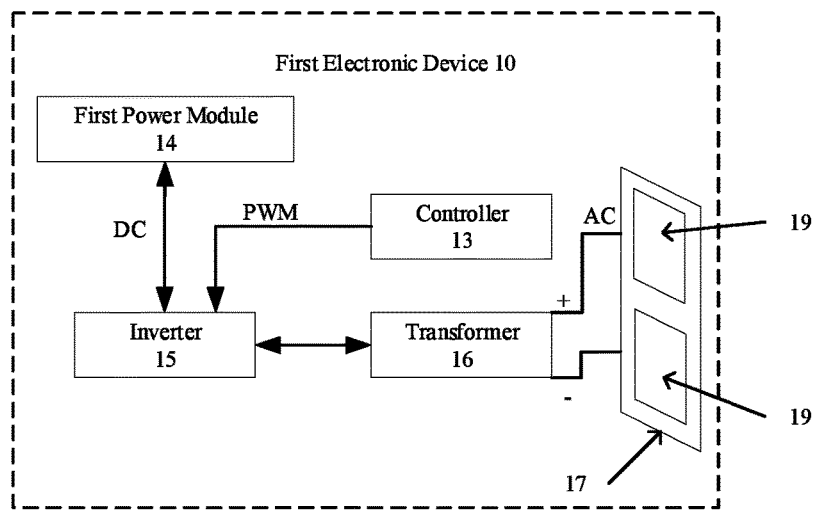
FIG. 3 is a schematic diagram of an electronic device according to an embodiment of the present disclosure.
Figure 4:
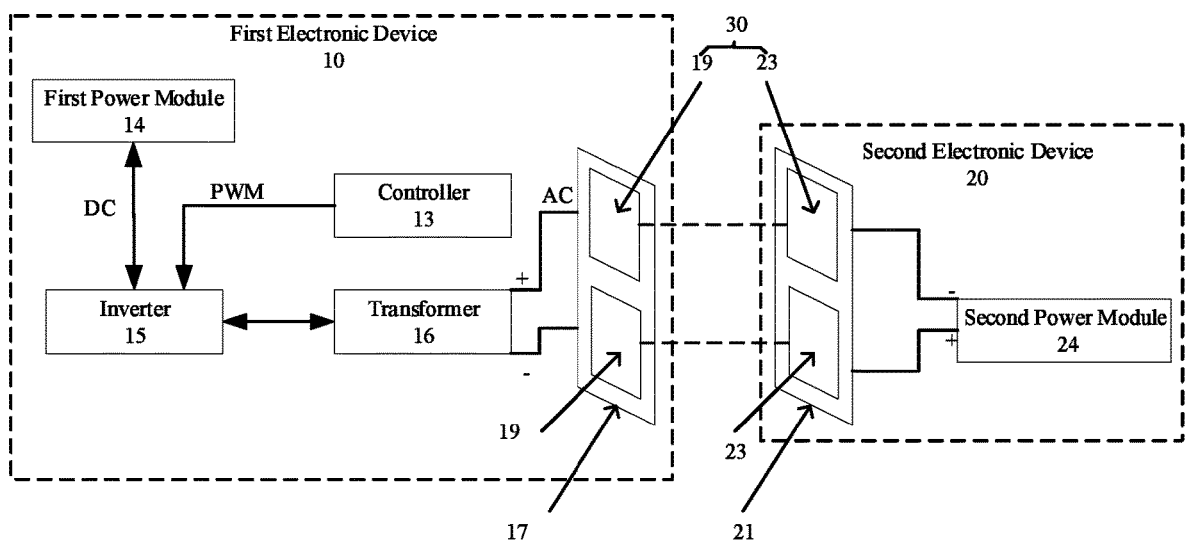
FIG. 4 is a schematic diagram of a wireless charging process of a first electronic device and a second electronic device.

The second electronic device 20 may include a second electrode layer 21. When the user places the second electronic device 20 on the touch panel 12 of the first electronic device 10 and the second electrode layer 21 is opposite to the first electrode layer 17, the second electrode layer 21 may form a charging capacitor unit with the first electrode layer 17. The charging capacitor unit may include at least one pair of coupling capacitors 30. As shown in FIG. 3 and FIG. 4, the positive pole and the negative pole of a first power module 14 of the first electronic device 10 are respectively connected to the pair of coupling capacitors 30, and the positive pole and the negative pole of a second power module 24 are also respectively connected to the pair of coupling capacitors 30 to form a loop. The charging capacitor unit can be used as a power transfer part of capacitive wireless charging, and can transfer alternating current (AC) between the first electronic device 10 and the second electronic device 20.

The second electronic device 20 may be a notebook computer, a tablet, s smart phone, or other electronic devices having the second electrode layer 21 and capable of capacitive wireless charging. The second electrode layer 21 may be an electrode layer disposed on the housing of the second electronic device 20 for wireless charging, such as a metal plate or metal layer disposed on the surface of the housing. The second electrode layer 21 may also be similar to the first electrode layer 17, as an electrode layer of the touch panel of the second electronic device 20, configured to detect the touch position of the touch object on the touch panel of the second electronic device 20.

In practical application, whether a to-be-detected object is placed on the touch panel 12 of the first electronic device 10 can be first determined. When it is determined that the to-be-detected object is placed on the touch panel 12, whether the to-be-detected object is the second electronic device 20 can be determined. There are various ways to determine whether the to-be-detected object is placed on the touch panel 12. For example, whether the to-be-detected object is placed on the touch panel may be determined based on capacitance, pressure, or photoelectric induction. Further, determine whether the to-be-detected object is the second electronic device 20 may be implemented based on characteristic identification or protocol interaction. For example, whether the to-be-detected object is the second electronic device 20 may be identified by identifying the characteristic signal of the second electrode layer 21.

120, controlling the first electrode layer 17 and the opposite second electrode layer 21 to form the charging capacitor unit when it is determined that the second electronic device 20 is placed on the touch panel.

In some embodiments, determining that the second electronic device 20 is placed on the touch panel 12 may be understood as the second electronic device 20 is placed on the touch panel 12, and the second electrode layer 21 is opposite to the first electrode layer 17. In this case, the first electrode layer 17 and the second electrode layer 21 can be coupled to form a charging capacitor unit, and the first electronic device 10 and the second electronic device 20 can use the charging capacitor unit for power transmission. The first electrode layer 17 and the second electrode layer 21 can be coupled to form a charging capacitor unit, which is not only limited to being physically coupled to form a pair of coupling capacitors 30, but also includes that the first electronic device 10 and the second electronic device 20 support the same wireless charging protocol, such that the first electronic device 10 and the second electronic device 20 can use the pair of coupling capacitors 30 for wireless charging.

When it is determined that the second electronic device 20 is placed on the touch panel 12, based on the wireless charging protocol jointly supported by the first electronic device 10 and the second electronic device 20, the first electronic device 10 may be controlled to exchange information with the second electronic device 20 through the first electrode layer 17 and the second electrode layer 21 to determine whether the power transmission conditions are met. When it is determined that the first electronic device 10 and the second electronic device 20 meet the power transmission conditions, the first electrode layer 17 and the second electrode layer 21 may be controlled to form a pair of coupling capacitors 30.

In some embodiments, the interaction between the first electronic device 10 and the second electronic device 20 may be controlled to determine information such as the remaining power of the first electronic device 10, the remaining power of the second electronic device 20, whether each of the first electronic device 10 and the second electronic device 20 is connected to the city power, or the power parameters of the first electronic device 10 and the second electronic device 20, and determine whether the first electronic device 10 and the second electronic device 20 meet the power transmission conditions based on the above information.

In some embodiments, the first electronic device 10 and the second electronic device 20 may be determined to meet the power transmission conditions when the power parameters of the first electronic device 10 and the second electronic device 20 match, and one of the first electronic device 10 and the second electronic device 20 needs to be charged, and the other can provide power.

For example, when the power parameters of the first electronic device 10 and the second electronic device 20 match, and one of the first electronic device 10 and second electronic device 20 needs to be charged, and the other can provide power, the power transmission conditions can be determined as being met. Alternatively, when the power parameters of the first electronic device 10 and the second electronic device 20 match, and the remaining power of the first electronic device 10 and the second electronic device 20 are both greater than a first threshold, the power transmission conditions of the first electronic device 10 and the second electronic device 20 can be determined as unmet.

Of course, in specific implementations, power transmission conditions are generally not unique. In general, multiple power transmission conditions are configured based on actual needs. If any one of the power transmission conditions is met, the first electronic device 10 and the second electronic device 20 may be considered to meet the power transmission conditions.

130, controlling the first power module 14 of the first electronic device 10 to provide power to the first electrode layer 17 to supply power to the second electronic device 20 through the charging capacitor unit; or, controlling the first power module 14 to receive AC power transmitted by the second electronic device 20 through the charging capacitor unit.

The first electronic device 10 and the second electronic device 20 may negotiate based on the wireless charging protocol to determine which one is the power supplier and which one is the power receiver. For example, during the process of information exchange between the first electronic device 10 and the second electronic device 20 to determine whether the power transmission conditions are met, the direction of power transmission may be negotiated together, that is, which one of the first electronic device 10 and the second electronic device 20 is the power supplier can be determined.

For example, when the first electronic device 10 is connected to the city power, the second electronic device 20 is not connected to the city power, and the remaining power of the second electronic device 20 is insufficient, the first electronic device 10 may be determined as the power supplier, and the first power module 14 of the first electronic device 10 may be controlled to supply alternating current to the first electrode layer 17, thereby supplying power to the second electronic device 20 through the charging capacitor unit.

In another example, take the first electronic device 10 as a notebook computer and the second electronic device 20 as a smart phone as an example. A first touch screen may be provided on the C-side of the notebook computer, and the first touch screen may include the first electrode layer 17. The touch component of a second touch screen of the smart phone may include the second electrode layer 21. When the remaining power of the notebook computer is low and the remaining power of the smart phone is sufficient, the smart phone may be placed on the first touch screen of the notebook computer in a way that the second touch screen is facing the first touch screen. In this case, the notebook computer and the smart phone can determine that smart phone as the power supplier and the notebook computer as the power receiver through interaction, and the first power module 14 of the notebook computer can be controlled to receive AC power from the smart phone through the charging capacitor unit.

Consistent with the present disclosure, when it is determined that the second electronic device 20 is placed on the touch panel 12 of the first electronic device 10, the coupling between the first electrode layer 17 of the touch panel 12 and the second electrode layer 21 of the second electronic device 20 can be controlled to form a charging capacitor unit. In this way, the first electronic device 10 can supply power to the second electronic device 20 through the charging capacitor unit, or obtain power from the second electronic device 20 to realize wireless charging. In this way, the touch panel 12 not only serves as an input device for the user to control the first electronic device through touch, but also servers as a wireless charging device to wirelessly charge the second electronic device 20 or obtain power wirelessly from the second electronic device 20, thereby expanding the function of the touch panel 12 such that the first electronic device 10 can have a wireless charging function without a separate wireless charging device, which is beneficial to simplifying the device structure, reducing production costs, and improving user experience.

In some embodiments, determining whether the second electronic device 20 is placed on the touch panel 12 of the first electronic device 10 in the process at 110 may further include the following processes.

111, controlling a third electrode layer of the first electronic device 10 to power off when it is determined that the to-be-detected object is placed on the touch panel 12, where the third electrode layer may be opposite to the first electrode layer 17 and may be coupled to form a charging capacitor unit, the charging capacitor unit may be used to detect the touch position of the touch object on the touch panel 12.

112, requesting to detect whether the to-be-detected object belongs to the second electronic device 20 in response to the first electrode layer 17 outputting a detection signal conforming to a preset protocol.

113, determining that the to-be-detected object is the second electronic device 20 in response to receiving a feedback signal corresponding to the detection signal.

In some embodiments, the first electronic device 10 may not be configured to detect the touch position of the touch object on the touch panel 12 through the first electrode layer 17 alone, but may include the opposing first electrode layer 17 and third electrode layer. The first electrode layer 17 and the third electrode layer may be coupled to form a touch capacitive unit, and the touch capacitive unit may include an array formed by sub-capacitors. For example, the first electrode layer 17 may include lateral electrodes arranged in a grid shape, the third electrode layer may include vertical electrodes arranged in a grid shape, and the positions where the lateral electrodes and the vertical electrodes intersect may form the sub-capacitors. When the touch object is in contact with the touch panel 12, it will affect the capacitance of the corresponding sub-capacitor. Based on this principle, the touch position of the touch object can be detected. The surface of the object generally has surface charges, and when the object is placed on the touch panel 12, the capacitance of the sub-capacitor will change. Therefore, in the present disclosure, it is also possible to detect whether the to-be-detected object is placed on the touch panel 12 based on this principle. Of course, whether there is a to-be-detected object on the touch panel 12 can also be detected based on other principles such as pressure or current.

Figure 2:
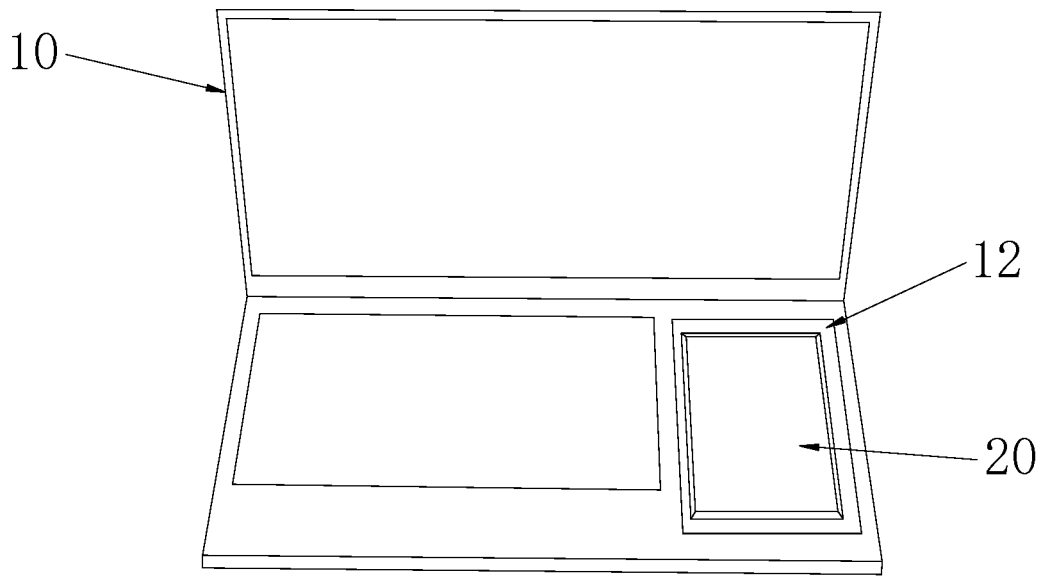
FIG. 2 is a schematic diagram of a scene of the control method according to an embodiment of the present disclosure.

The preset protocol may be the wireless charging protocol supported by the first electronic device 10. As shown in FIG. 2, when it is determined that the to-be-detected object is placed on the touch panel 12, the third electrode layer may be controlled to be powered off, and a communication module of the first electronic device 10 may be controlled to use the first electrode layer 17 to output a detection signal conforming to the wireless charging protocol. The detection signal may be an AC signal with a specific voltage and a specific frequency. If the second electronic device 20 also supports the wireless charging protocol, a communication module of the second electronic device 20 may receive the detection signal through the second electrode layer 21, analyze the detection signal, and send a feedback signal to the first electronic device 10 based on the agreement of the wireless charging protocol. If the to-be-detected object is not an electronic device, or even if it is an electronic device but does not support the wireless charging protocol, no feedback signal may be sent to the first electronic device 10. Therefore, after the first electronic device 10 sends the detection signal through the first electrode layer 17, if the feedback signal from the second electronic device 20 can be received through the first electrode layer 17 within a preset period of time, it can be determined that the to-be-detected object is the second electronic device 20.

Figure 5:
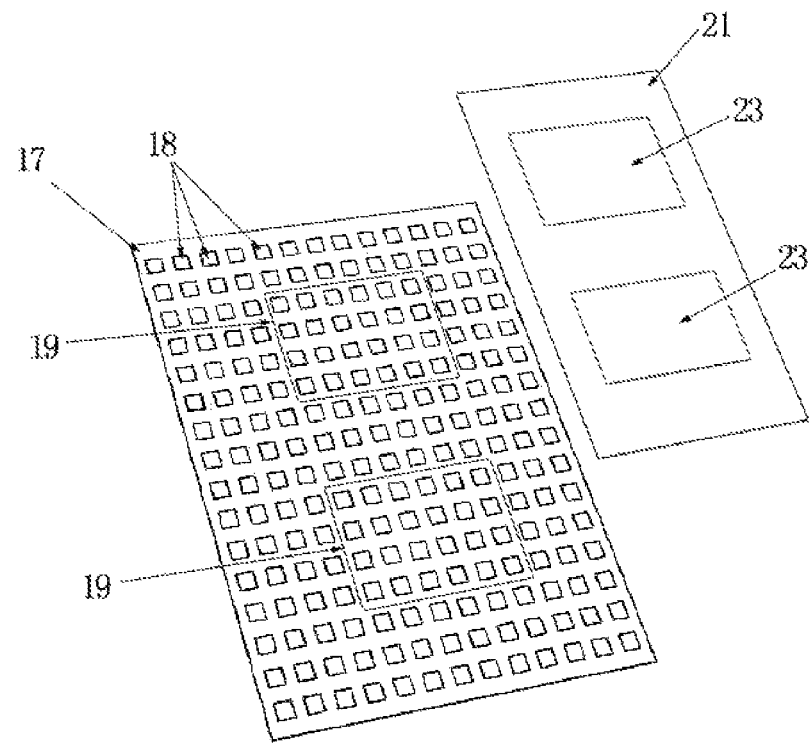
FIG. 5 is a schematic diagram of an embodiment of a process at 120 in the control method according to an embodiment of the present disclosure.

Refer to FIG. 5. In some embodiments, the first electrode layer 17 may include a plurality of first electrode unit 18 arranged along the touch panel 12, and the second electrode layer 21 may include a pair of second sub-electrodes 23. In this case, controlling the first electrode layer 17 and the second electrode layer 21 to form the charging capacitor unit in the process at 120 may include the following processes.

121, determining first position information of the pair of second sub-electrodes 23.

122, based on the first position information, controlling the first electrode units 18 opposite to the pair of second sub-electrodes 23 to form a pair of first sub-electrodes 19. The pair of first sub-electrodes 19 may be respectively coupled with the pair of second sub-electrodes 23 to form a pair of coupling capacitors 30, thereby forming the charging capacitor unit through the pair of coupling capacitors 30.

That is, the first electrode layer 17 may include a plurality of first electrode units 18. The first electrode units 18 may be sensing blocks evenly distributed along the first electrode layer 17, and the sensing blocks may serve as sensing units in the first electrode layer 17 to sense the touch position of the touch object. For example, the sensing blocks may be indium tin oxide (ITO) blocks disposed in the first electrode layer 17. Of course, the first electrode units 18 may also be induction units with other structures.

The second electrode layer 21 may include a pair of second sub-electrodes 23 whose sizes and position are relatively fixed. The pair of second sub-electrodes 23 may be electrodes specifically provided for capacitive charging. The pair of second sub-electrodes 23 may also be electrodes formed by the second electrode layer 21 of the touch panel. The second sub-electrodes may be configured to have fixed sizes and positions due to the limitation of the circuit connection relationship, protocol, or other factors of the second electrode layer 21.

Since the second electronic device 20 may form a pair of second sub-electrodes 23 with relatively fixed sizes and positions, when it is determined that the second electronic device 20 is placed on the touch panel 12, the first position information of the pair of second sub-electrodes 23 may be obtained and the first electrode units 18 in the first electrode layer 17 may be driven to form a pair of first sub-electrodes 19. As shown in FIG. 5, the pair of first sub-electrodes 19 and the pair of second sub-electrodes 23 are respectively opposite to each other, such that a pair of coupling capacitors 30 cam be coupled to form a charging capacitor unit.

For example, based on the first position information, the first electrode units 18 staggered from the pair of second sub-electrodes 23 may be controlled to be powered off, the first electrode units 18 opposite to the pair of second sub-electrodes 23 may be controlled to be powered on, and the pair of first sub-electrodes 19 may be formed by the powered first electrode units 18.

During specific implementation, the first position information of the pair of second sub-electrodes 23 may be obtained in various ways. For example, when it is determined that the second electronic device 20 is placed on the touch panel 12 of the first electronic device 10, the first electronic device 10 may use the first electrode layer 17 to interact with the second electronic device 20 based on the wireless charging protocol to obtain the first position information from the second electronic device 20. Alternatively, the first electronic device 10 may also detect the positions of the pair of second sub-electrodes 23.

In some embodiments, determining the first position information of the pair of second sub-electrodes 23 in the process at 121 may include applying a detection current to the first electrode units 18 in the first electrode layer 17 and obtaining a first power parameter of each of the first electrode units 18, and determining the first position information of the pair of second sub-electrodes 23 based on the first power parameters.

The first electrode unit 18 opposite to the second sub-electrode 23 may be coupled with the second sub-electrode 23 to form a coupling electrode. When a high-frequency current is applied to the first electrode unit 18, the coupling current is equivalent to a conductor, and the high-frequency current on the first electrode unit 18 can flow through the coupling current to the side of the second sub-electrode 23. Therefore, with respect to the first electrode unit 18 staggered from the second sub-electrode 23, the power parameter such as current and voltage of the first electrode unit 18 opposite to the second sub-electrode 23 will be different.

Based on this, if it is determined that the second electronic device 20 is placed on the touch panel 12 of the first electronic device 10, a detection current can be applied to the first electrode units 18 in the entire first electrode layer 17, and the first power parameter of each first electrode unit 18 can be obtained. By comparing the respective first power parameters, the first electrode units 18 opposite to the second sub-electrodes 23 can be accurately determined, that is, the first position information of the pair of second sub-electrodes 23 can be determined.

Take the touch panel 12 of the first electronic device 10 further including the third electrode layer as an example. A sub-capacitor array may be formed between the first electrode layer 17 and the third electrode layer. When the second electronic device 20 is placed on the touch panel 12, the second sub-electrodes 23 may be directly opposite to the first electrode layer 17, which will affect the capacitance of the sub-capacitors in the array. Therefore, the purpose of the determining the first position information may also be achieved by detecting the capacitance of the sub-capacitors. It should be noted that the method for detecting the first position information described above is only an example, and during specific implementation, the detection of the first position information is not limited to the principles described above.

Figure 6:
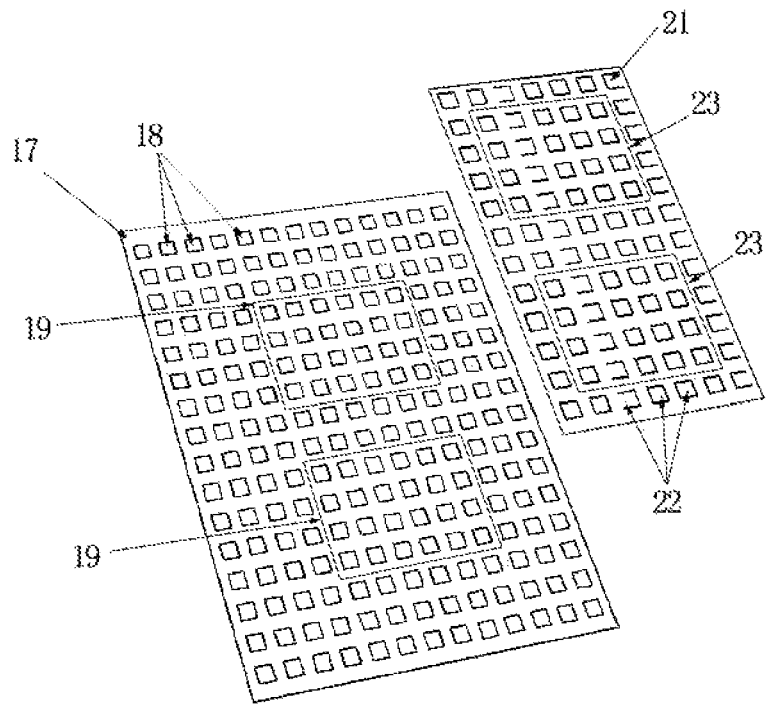
FIG. 6 is a schematic diagram of another embodiment of the process at 120 in the control method according to an embodiment of the present disclosure.

Refer to FIG. 6. In some embodiments, the first electrode layer 17 may include a plurality of evenly arranged first electrode units 18, and the second electrode layer 21 may include a plurality of evenly arranged second electrode units 22. In this case, controlling the first electrode layer 17 and the second electrode layer 21 to form the charging capacitor unit in the process at 120 may include the following processes.

123, negotiating second position information of the charging capacitor unit with the second electronic device 20.

124, based on the second position information, controlling several of the first electrode units 18 to form a pair of first sub-electrodes 19 for the first sub-electrodes 19 and the respectively opposite pair of second sub-electrodes 23 of the second electronic device 20 to form a pair of coupling capacitors 30, thereby forming the charging capacitor unit through the pair of coupling capacitors 30, where the pair of second sub-electrodes 23 may be formed by several of the second electrode units 22 that are powered on.

When the touch panel 12 of the first electronic device 10 has the first electrode units 18 arranged in an array and the second electronic device 20 has the second electrode units 22 arranged in an array, when the first electronic device 10 and the second electronic device 20 are wirelessly charged based on the principle of capacitive wireless charging, the sizes and positions of the coupling capacitors 30 may not be fixed. The first electronic device 10 may negotiate the sizes and positions of the coupling capacitors 30 with the second electronic device 20 based on the wireless charging protocol, that is, negotiate the second position information of the charging capacitor unit.

Subsequently, based on the second position information, the first electronic device 10 may control the first electrode units 18 corresponding to the second position information to be powered on, and control the remaining first electrode units 18 of the first electrode layer 17 to be powered off to form a pair of first sub-electrodes 19. Based on the second position information, the second electronic device 20 may also control the second electrode units 22 corresponding to the second position information to be powered on, and control the remaining second electrode units 22 in the second electrode layer 21 to be powered off to form a pair of second sub-electrodes 23. As shown in FIG. 6, the pair of first sub-electrodes 19 are opposite to the pair of second sub-electrodes 23. Further, the pair of first sub-electrodes 19 and the pair of second sub-electrodes 23 are coupled to form a pair of coupling capacitors 30, and a charging capacitor unit is formed by the pair of coupling capacitors 30.

In some embodiments, negotiating the second position information of the charging capacitor unit with the second electronic device 20 in the process at 123 may include negotiating the second position information based on a first power supply parameter of the first electronic device 10 and a second power supply parameter of the second electronic device 20.

In some embodiments, the first power supply parameter may include parameters such as voltage, current, and frequency when the first power module 14 outputs and inputs power, and the second power supply parameter may include parameters such as voltage, current, and frequency when the second power module 24 outputs and inputs power.

The first electronic device 10 may interact with the second electronic device 20 based on the wireless charging protocol to obtain the second power supply parameter of the second electronic device 20. Then, based on its own first power supply parameter and the second power supply parameter of the second electronic device 20, the first electronic device 10 may determine the wireless charging parameter when wireless charging is performed between the first electronic device 10 and the second electronic device 20. The wireless charging parameter may include parameters such as voltage, current, and frequency. Then, based on the determined wireless charging parameters, the second position information may be determined.

For example, when the first electronic device 10 and the second electronic device 20 negotiate and determine the current value during wireless charging, the area of the coupling capacitors 30 may be determined based on the current value. For example, if the current value during wireless charging between the first electronic device 10 and the second electronic device 20 is relatively large, the area of the coupling capacitors 30 may be configured to be larger. Alternatively, if the current value during wireless charging between the first electronic device 10 and the second electronic device 20 is relatively small, the area of the coupling capacitors 30 may be configured to be smaller. Then, the second position information may be negotiated and determined based on the area of the coupling capacitors 30.

Take the first electronic device 10 as a notebook computer and the second electronic device 20 as a smart phone as an example. When the area of the coupling capacitors 30 is determined, the second electrode layer 21 with a smaller area of the first electrode layer 17 and the second electrode layer 21 may be divided into two regions, and the second electrode layer 21 may be controlled to have the area of the second sub-electrode 23 in the middle of the two regions. The first electronic device 10 may control the first electrode layer 17 to form a first sub-electrode 19 at a position opposite to the second sub-electrode 23.

Of course, the manner of negotiating the second position information described above is an example. During implementation, as long as the first electronic device 10 and the second electronic device 20 can form a pair of coupling capacitors 30 by negotiating the second position information, and the charging capacitor unit can be formed by the pair of coupling capacitors 30, the control method described in the embodiments of the present disclosure can be performed.

In some embodiments, controlling the first power module 14 of the first electronic device 10 to provide AC power to the first electrode layer 17 to supply power to the second electronic device 20 through the charging capacitor unit in the process at 130 may further include the following processes.

131, controlling the first power module 14 to output direct current (DC) power.

132, converting DC power output by the first power module 14 into AC power through an inverter 15.

133, transform the AC power output by the inverter 15 through a transformer 16 to form AC power suitable for the second electronic device 20.

That is, the first electronic device 10 may include a first power module 14, an inverter 15, and a transformer 16, and the first power module 14, the inverter 15, the transformer 16, and the first electrode layer 17 may be connected in sequence. When the first electronic device 10 supplies power to the second electronic device 20, the first power module 14 may be controlled to output DC power, which can be converted into AC power through the inverter 15. The AC power output by the inverter 15 may be transformed through the transformer 16 to form AC power suitable for the second electronic device 20. In some embodiments, when the wireless charging parameter has been negotiated in advance, the inverter 15 and the transformer 16 may be controlled to operate based on the wireless charging parameters.

In some embodiments, converting the DC power output by the first power module 14 into AC power may include sending a pulse signal to the inverter 15 such that the inverter 15 may convert the DC power output by the first power module 14 into AC power based on the pulse signal.

That is, when the inverter 15 of the first electronic device 10 is a pulse width module (PWM) inverter 15, the pulse generator may be controlled to generate a pulse signal based on the wireless charging parameter, and send the pulse signal to the inverter 15. In this way, the inverter 15 may convert the DC power output by the first power module 14 into AC power based on the pulse signal. This inverter circuit has a simple structure and is easy to implement.

In some embodiments, controlling the first power module 14 to receive the AC power transmitted by the second electronic device 20 using the charging capacitor unit may include transforming the AC power transmitted by the second electronic device 20 using the charging capacitor unit through the transformer 16 to form AC power suitable for the first electronic device 10, and converting the AC power suitable for the first electronic device 10 into DC power through the inverter 15 and outputting the DC power to the first power module 14.

That is, when the second electronic device 20 supplies power to the first electronic device 10, the first electronic device 10 may receive AC power from the second electronic device 20 through the charging capacitor unit, then transform the received AC power through the transformer 16 to adjust the voltage of the AC power for it to be compatible with the first power module 14. Subsequently, the AC power output by the transformer 16 may be rectified into DC power through the inverter 15 and output to the first power module 14. The first power module 14 may use this power to charge the battery of the first electronic device 10, and may also directly supply power to the load of the first electronic device 10.

Refer to FIG. 4 and FIG. 5, an electronic device in one embodiment of the present disclosure includes a touch panel 12, a controller 13, and a first power module 14.

The touch panel 12 may include a first electrode layer 17, and the first electrode layer 17 may be configured to detect a touch position of a touch object on the touch panel 12.

The controller 13 may be configured to determine whether a second electronic device 20 is placed on the touch panel 12. The second electronic device 20 may include a second electrode layer 21 that can form a charging capacitor unit with the first electrode layer 17. When it is determined that the second electronic device 20 is placed on the touch panel 12, the first electrode layer 17 and the opposite second electrode layer 21 may be controlled to from the charging capacitor unit.

The first power module 14 may be configured to provide power to the first electrode layer 17 under the control of the controller 13 to supply power to the second electronic device 20 through the charging capacitor unit. Alternatively, the first power module 14 may be configured to receive power transmitted by the second electronic device 20 through the charging capacitor unit under the control of the controller 13.

In some embodiments, the first electrode layer 17 may include a plurality of first electrode units 18 arranged along the touch panel 12, and the second electrode layer 21 may include a pair of second sub-electrodes 23, and the controller 13 may be configured to:

determine first position information of the pair of second sub-electrodes 23 and based on the first position information, control the first electrode units 18 opposite to the pair of second sub-electrodes 23 to form a pair of first sub-electrodes 19. The pair of first sub-electrodes 19 may be respectively coupled with the pair of second sub-electrodes 23 to form a pair of coupling capacitors 30, thereby forming the charging capacitor unit through the pair of coupling capacitors 30.

In some embodiments, the controller 13 may be configured to apply a detection current to the first electrode units 18 in the first electrode layer 17 and obtain a first power parameter of each of the first electrode units 18, and determine the first position information of the pair of second sub-electrodes 23 based on the first power parameters.

In some embodiments, the first electrode layer 17 may include a plurality of first electrode units 18 evenly arranged along the touch panel 12, and the second electrode layer 21 may include a plurality of second electrode units 22 evenly arranged along a surface of the second electronic device 20. The controller 13 may be configured to:

negotiate second position information of the charging capacitor unit with the second electronic device 20; and based on the second position information, control several of the first electrode units 18 to form a pair of first sub-electrodes 19 for the first sub-electrodes 19 and the respectively opposite pair of second sub-electrodes 23 of the second electronic device 20 to form a pair of coupling capacitors 30, thereby forming the charging capacitor unit through the pair of coupling capacitors 30, where the pair of second sub-electrodes 23 may be formed by several of the second electrode unit 22 that are powered on.

In some embodiments, the controller 13 may be configured to negotiate the second position information based on a first power supply parameter of the first electronic device 10 and a second power supply parameter of the second electronic device 20.

In some embodiments, the controller 13 may be configured to:

control a third electrode layer of the first electronic device 10 to power off when it is determined that the to-be-detected object is placed on the touch panel 12, where the third electrode layer may be opposite to the first electrode layer 17 and may be coupled to form a charging capacitor unit, the charging capacitor unit may be used to detect the touch position of the touch object on the touch panel 12;

output a detection signal conforming to a preset protocol through the first electrode layer 17 to request to detect whether the to-be-detected object belongs to the second electronic device 20; and determine that the to-be-detected object is the second electronic device 20 in response to receiving a feedback signal corresponding to the detection signal.

In some embodiments, the electronic device may further include an inverter 15 and a transformer 16. In this case, the first power module 14 may be configured to output DC power under the control of the controller 13, the inverter 15 may be configured to convert the DC power output by the first power module 14 into AC power, and the transformer 16 may be configured to transform the AC power output by the inverter 15 to form AC power suitable for the second electronic device 20.

In some embodiments, the controller 13 may be further configured to send a pulse signal to the inverter 15 to cause the inverter 15 to convert the DC power output by the first power module 14 into AC power based on the pulse signal.

In some embodiments, the electronic device may further include an inverter 15 and a transformer 16. In this case, the transformer 16 may be configured to transform the AC power transmitted by the second electronic device 20 through the charging capacitor unit to form an AC power suitable for the first electronic device 10, and the inverter 15 may be configured to convert the AC power suitable for the first electronic device 10 into DC power and output it to the first power module 14.

The above examples are only exemplary embodiments of the present disclosure and are not intended to limit the scope of the disclosure, which is defined by the claims. It is contemplated that various modifications and equivalent replacements may be made to the disclosure within the essence and protection scope thereof, and such modifications and replacements may be regarded as falling in the protection scope of the disclosure.

What is claimed is:

1. A control method comprising:
   determining whether a second electronic device is placed on a touch panel of a first electronic device, the touch panel including a first electrode layer, the first electrode layer being configured to detect a touch position of a touch object on the touch panel, the second electronic device including a second electrode layer, the second electrode layer being configured to form a charging capacitor unit with the first electrode layer;
   controlling the first electrode layer and the second electrode layer opposite to the first electrode layer to form the charging capacitor unit when it is determined that the second electronic device is placed on the touch panel; and
   controlling a first power module of the first electronic device to provide power to the first electrode layer to supply power to the second electronic device through the charging capacitor unit; or, controlling the first power module to receive power transmitted by the second electronic device through the charging capacitor unit.

2. The control method of claim 1, wherein:
   the first electrode layer includes a plurality of first electrode units evenly arranged along the touch panel;
   the second electrode layer includes a pair of second sub-electrodes; and
   controlling the first electrode layer and the opposite second electrode layer to form the charging capacitor unit includes:
      determining first position information of the pair of second sub-electrodes; and
      based on the first position information, controlling the first electrode units opposite to the pair of second sub-electrodes to form a pair of first sub-electrodes for the pair of first sub-electrodes to be respectively coupled with the pair of second sub-electrodes to form a pair of coupling capacitors to form the charging capacitor unit through the pair of coupling capacitors.

3. The control method of claim 2, wherein determining the first position information of the pair of second sub-electrodes includes:
   applying a detection current to the first electrode units in the first electrode layer, and obtaining first power parameters of each of the first electrode units and
   determining the first position information of the pair of second sub-electrodes based on the first power parameters.

4. The control method of claim 1, wherein:
   the first electrode layer includes a plurality of first electrode units evenly arranged along the touch panel;
   the second electrode layer includes a plurality of second electrode units evenly arranged along a surface of the second electronic device; and
   controlling the second electrode layer and the opposite second electrode layer to form the charging capacitor unit includes:
      negotiating second position information of the charging capacitor unit with the second electronic device;
      based on the second position information, controlling several of the first electrode units to form a pair of first sub-electrodes for the first sub-electrodes and a pair of respectively opposite second sub-electrodes of the second electronic device to form a pair of coupling capacitors to form the charging capacitor unit through the pair of coupling capacitors, the pair of second sub-electrodes being formed by several of the powered second electrode units.

5. The control method of claim 4, wherein negotiating the second position information of the charging capacitor unit with the second electronic device includes:
   negotiating the second position information based on a first power supply parameter of the first electronic device and a second power supply parameter of the second electronic device.

6. The control method of claim 1, wherein determining whether the second electronic device is placed on the touch panel of the first electronic device includes:
   controlling a third electrode layer of the first electronic device to power off when it is determined that a to-be-detected object is placed on the touch panel, the third electrode layer being opposite to the first electrode layer and configured to be coupled with the first electrode layer to form a touch capacitance unit, the touch capacitance unit being configured to detect the touch position of the touch object on the touch panel;
   outputting a detection signal conforming to a preset protocol through the first electrode layer to request to detect whether the to-be-detected object belongs to the second electronic device; and
   determining the to-be-detected object is the second electronic device in response to receiving a feedback signal corresponding to the detection signal.

7. The control method of claim 1, wherein controlling the first power module of the first electronic device to provide power to the first electrode layer to supply power to the second electronic device through the charging capacitor unit includes:
   controlling the first power module to output direct current (DC) power;
   converting the DC power output by the first power module into alternating current (AC) power through an inverter; and
   transforming the AC power output from the inverter through a transformer to form AC power suitable for the second electronic device.

8. The control method of claim 7, wherein converting the DC power output by the first power module into AC power includes:

sending a pulse signal to the inverter to cause the inverter to convert the DC power output by the first power module into AC power based on the pulse signal.

9. The control method of claim 1, wherein controlling the first power module to receive power transmitted by the second electronic device through the charging capacitor unit includes:
   transforming AC power transmitted by the second electronic device through the charging capacitor unit through a transformer to form AC power suitable for the first electronic device; and
   converting the AC power suitable for the first electronic device into DC power through an inverter and outputting the DC power to the first power module.

10. An electronic device comprising:
   a touch panel, the touch panel including a first electrode layer, the first electrode layer being configured to detect a touch position of a touch object on the touch panel;
   a controller configured to determine whether a second electronic device is placed on the touch panel, the second electronic device including a second electrode layer, the second electrode layer being configured to form a charging capacitor unit with the first electrode layer, the first electrode layer being controlled to form the charging capacitor unit with the opposite second electrode layer when it is determined that the second electronic device is placed on the touch panel; and
   a first power module configured to provide power to the first electrode layer under the control of the controller to supply power to the second electronic device through the charging capacitor unit; or to receive power transmitted by the second electronic device through the charging capacitor unit under the control of the controller.

11. The electronic device of claim 10, wherein:
   the first electrode layer includes a plurality of first electrode units arranged along the touch panel;
   the second electrode layer includes a pair of second sub-electrodes; and
   the controller is configured to:
      determine first position information of the pair of second sub-electrodes; and
      based on the first position information, control the first electrode units opposite to the pair of second sub-electrodes to form a pair of first sub-electrodes, the pair of first sub-electrodes being respectively coupled with the pair of second sub-electrodes to form a pair of coupling capacitors for forming the charging capacitor unit.

12. The electronic device of claim 11, wherein the controller is further configured to:
   apply a detection current to the first electrode units in the first electrode layer and obtain first power parameters of each of the first electrode units; and
   determine the first position information of the pair of second sub-electrodes based on the first power parameters.

13. The electronic device of claim 10, wherein:
   the first electrode layer includes a plurality of first electrode units evenly arranged along the touch panel;
   the second electrode layer includes a plurality of second electrode units evenly arranged along a surface of the second electronic device; and
   the controller is further configured to:
      negotiate second position information of the charging capacitor unit with the second electronic device; and
      based on the second position information, control several of the first electrode units to form a pair of first sub-electrodes for the first sub-electrodes and a pair of respectively opposite second sub-electrodes of the second electronic device to form a pair of coupling capacitors for forming the charging capacitor unit, the pair of second sub-electrodes being formed by several of the powered second electrode units.

14. The electronic device of claim 13, wherein the controller is further configured to:
   negotiate the second position information based on a first power supply parameter of the first electronic device and a second power supply parameter of the second electronic device.

15. The electronic device of claim 10, wherein the controller is further configured to:
   control a third electrode layer of the first electronic device to power off in response to determining that a to-be-detected object is placed on the touch panel, the third electrode layer being opposite to the first electrode layer and configured to be coupled to the first electrode layer to form the charging capacitor unit configured to detect the touch position of the touch object on the touch panel;
   output a detection signal conforming to a preset protocol through the first electrode layer to request to detect whether the to-be-detected object belongs to the second electronic device; and
   determine the to-be-detected object is the second electronic device in response to receiving a feedback signal corresponding to the detection signal.

16. The electronic device of claim 10 further comprising:
   an inverter; and
   a transformer, wherein the controller is further configured to:
      control the first power module to output direct current (DC) power;
      control the inverter to convert the DC power output by the first power module into alternating current (AC) power through; and
      control the transformer to transform the AC power output from the inverter to form AC power suitable for the second electronic device.

17. The control method of claim 16, wherein the controller is further configured to:
   sending a pulse signal to the inverter to cause the inverter to convert the DC power output by the first power module into AC power based on the pulse signal.

18. The electronic device of claim 10 further comprising:
   an inverter; and
   a transformer, wherein the controller is further configured to:
      control the transformer to transform the AC power transmitted by the second electronic device through the charging capacitor unit to form the AC power suitable for the first electronic device; and
      control the inverter to convert the AC power suitable for the first electronic device into DC power and output the DC power to the first power module.

19. A non-transitory computer-readable storage medium containing computer-executable instructions for, when executed by one or more processors, performing a control method applied to a first electronic device, the method comprising:
   determining whether a second electronic device is placed on a touch panel of the first electronic device, the touch panel including a first electrode layer, the first electrode layer being configured to detect a touch position of a touch object on the touch panel, the second electronic device including a second electrode layer, the second electrode layer being configured to form a charging capacitor unit with the first electrode layer;

controlling the first electrode layer and the second electrode layer opposite to the first electrode layer to form the charging capacitor unit when it is determined that the second electronic device is placed on the touch panel; and controlling a first power module of the first electronic device to provide power to the first electrode layer to supply power to the second electronic device through the charging capacitor unit; or, controlling the first power module to receive power transmitted by the second electronic device through the charging capacitor unit.

20. The non-transitory computer-readable storage medium of claim 19, wherein:

the first electrode layer includes a plurality of first electrode units evenly arranged along the touch panel;

the second electrode layer includes a pair of second sub-electrodes; and controlling the first electrode layer and the opposite second electrode layer to form the charging capacitor unit includes:

determining first position information of the pair of second sub-electrodes; and based on the first position information, controlling the first electrode units opposite to the pair of second sub-electrodes to form a pair of first sub-electrodes for the pair of first sub-electrodes to be respectively coupled with the pair of second sub-electrodes to form a pair of coupling capacitors to form the charging capacitor unit through the pair of coupling capacitors.

\* \* \* \* \*